US010543723B2

(12) United States Patent
Palaoro

(10) Patent No.: US 10,543,723 B2
(45) Date of Patent: Jan. 28, 2020

(54) AIR PRESSURE MEASURING DEVICE FOR A VEHICLE TIRE AND METHOD FOR ASSEMBLING THE AIR PRESSURE MEASURING DEVICE

(71) Applicant: Alligator Ventilfabrik GmbH, Giengen/Brenz (DE)

(72) Inventor: Renato Palaoro, Heidenheim (DE)

(73) Assignee: Alligator Ventilfabrik GmbH, Giengen/Brenz (DE)

( * ) Notice: Subject to any disclaimer, the term of this patent is extended or adjusted under 35 U.S.C. 154(b) by 186 days.

(21) Appl. No.: 15/561,125

(22) PCT Filed: Jan. 13, 2016

(86) PCT No.: PCT/EP2016/050498
§ 371 (c)(1),
(2) Date: Sep. 25, 2017

(87) PCT Pub. No.: WO2016/150579
PCT Pub. Date: Sep. 29, 2016

(65) Prior Publication Data
US 2018/0126806 A1 May 10, 2018

(30) Foreign Application Priority Data
Mar. 24, 2015 (DE) .................. 10 2015 104 435

(51) Int. Cl.
*B60C 23/04* (2006.01)
*B60C 29/00* (2006.01)
*B60C 29/02* (2006.01)

(52) U.S. Cl.
CPC ........ *B60C 23/0494* (2013.01); *B60C 29/005* (2013.01); *B60C 29/02* (2013.01)

(58) Field of Classification Search
CPC .... B60C 23/0494; B60C 29/02; B60C 29/005
(Continued)

(56) References Cited

U.S. PATENT DOCUMENTS 4,686,855 A * 8/1987 Smith ................. B60C 23/0496
340/447
5,215,137 A * 6/1993 Weeks .................... B60B 25/22
152/379.4
(Continued)

FOREIGN PATENT DOCUMENTS

CH 20405 A 1/1901
CN 1865030 A 11/2006
(Continued)

OTHER PUBLICATIONS

International search report for application No. PCT/EP2016/050498 dated Apr. 12, 2016.
German search report for patent application No. 10 2015 104 435.8 dated Jan. 19, 2016.

*Primary Examiner* — S. Joseph Morano
*Assistant Examiner* — Jean W Charleston
(74) *Attorney, Agent, or Firm* — Bachman & LaPointe, PC

(57) ABSTRACT

Air pressure measuring device (10) for a vehicle wheel (2), having a valve body (11) which constitutes a first element (31) and which can be inserted in a through-hole (5) in a vehicle wheel rim (1), having a cap nut (30) which constitutes a second element (32) for axially tensioning valve body (11) on the vehicle wheel rim (1), wherein when the air pressure measuring device (10) is in the installed state a threaded connection (35) is created between the valve body (11) and the cap nut (30), consisting of a thread (40) formed on the valve body (11) and a thread (41) formed on cap nut (30), wherein, in order to create one of the two threads (40, 41) both elements (31, 32) are made from materials of different hardnesses, a self-cutting thread (40) is produced in the element (31) that is made of the harder material, and a deforming section (39) is produced in the element (32) that is made of the softer material, in and in which the other (Continued)

thread (41) can be created by cooperation with the self-cutting thread (40).

10 Claims, 1 Drawing Sheet

(58) Field of Classification Search
USPC .................................... 152/427, 428, 429
See application file for complete search history.

(56) References Cited

U.S. PATENT DOCUMENTS

| | | | |
|---|---|---|---|
| 6,557,406 B2* | 5/2003 | Gabelmann | B60C 23/0408 |
| | | | 73/146.5 |
| 6,912,897 B2* | 7/2005 | Luce | B60C 23/0408 |
| | | | 340/442 |
| 8,474,312 B2* | 7/2013 | Liao | B60C 23/0494 |
| | | | 73/146.8 |
| 9,744,819 B2* | 8/2017 | Gosi | B60C 23/0494 |
| 2006/0027299 A1 | 2/2006 | Keller | |

FOREIGN PATENT DOCUMENTS

| | | |
|---|---|---|
| DE | 1928355 A1 | 12/1970 |
| DE | 20321300 U1 | 8/2006 |
| DE | 102013113500 A1 | 6/2015 |
| EP | 1277601 A2 | 1/2003 |
| EP | 1765609 A1 | 3/2007 |

\* cited by examiner

AIR PRESSURE MEASURING DEVICE FOR A VEHICLE TIRE AND METHOD FOR ASSEMBLING THE AIR PRESSURE MEASURING DEVICE

BACKGROUND OF THE INVENTION

The invention relates to an air pressure measuring device for a vehicle tire. The invention further relates to a method for assembling an air pressure measuring device according to the invention air pressure measuring device an inner vehicle wheel rim.

An air pressure measuring device for a vehicle tire and a method for assembling an air pressure measuring device of such kind are known from EP 1 277 601 B1 issued to the Applicant. The known air pressure measuring device essentially comprises three elements: A valve body, which can be inserted in a through-hole in a vehicle wheel rim, a cap nut which can be screwed onto the valve body on the outside of the vehicle wheel rim, and a fastening element in the form of a fixing screw arranged on an end face of the valve body on the side facing the inside of the vehicle wheel rim. The fixing screw is fitted in the valve body by means of a threaded connection, wherein the fixing screw has an outer contour which cooperates with a geometry conformed on a "signal housing" to create a positive lock in such manner that the fixing screw is arranged in the signal housing so as to be displaceable axially but rotationally immobile. The signal housing in turn is connected to the vehicle wheel rim and arranged thereon so as to be rotationally immobile. The cap nut also has a rib formed in the area of its thread. When the cap nut is screwed onto the thread of the valve body, said rib of the cap nut first comes into contact with a surface of the valve body which functions as an end stop for the rib. The effect of this is that initially the cap nut is unable to rotate relative to the valve body any more, but when a torque is applied to the cap nut it rotates about its own longitudinal axis together with the valve body. Due to the rotationally immobile fitting of the fixing screw in the signal housing, the result of this is that the fixing screw is screwed onto the thread of the valve body. As soon as the fastening element has reached its axial end position on the mounting thread of the valve body, a further application of a torque to the cap nut results in the destruction or breakage of the rib, thereby allowing the cap nut to be rotated further on the thread of the valve body. This shortens the axial distance between the end face of the cap nut facing the through-hole in the vehicle wheel rim and the vehicle wheel rim and thus enables the valve body to be tensioned or fixed axially in the through-hole in the vehicle wheel rim. At the same time, the cap nut seals the interior space of the vehicle wheel rim off from the outside, particularly since a sealing element is arranged in the area of the through-hole.

The essential feature is that the air pressure measuring device known from the prior art has threads which cooperate with each other on both the valve body and the cap nut. Particularly in order to avoid corrosion, said components (the valve body and the cap nut) must be made from a corrosion-resistant material and/or must be equipped with a corresponding coating. In the case of the cap nut, this is addressed for example in that the cap nut is made from aluminium and has undergone anodization. It is relative complicated and thus also expensive to manufacture such a cap nut, having a thread as well as the rib described previously and the coating.

DISCLOSURE OF THE INVENTION

Starting from the stated prior art, the object underlying the invention is to improve an air pressure measuring device for a vehicle tire in such manner that reduced manufacturing costs are achievable without impairing the functionalist of the air pressure measuring device.

This object is solved according to the invention in an air pressure measuring device for a vehicle tire having the characterizing features disclosed herein. In order to form one of the two threads between the valve body and the cap nut the two elements (valve body and cap nut) are made from materials with different hardnesses, a self-cutting thread is formed in the element which is made from the harder material, and a deforming section is created in the element which is made from the softer material, in which deforming section the other thread may be created during interaction with the self-cutting thread.

In other words, this means that according to the invention it is no longer necessary to create a thread beforehand in each of the two elements (valve body and cap nut) which form the threaded connection. As a consequence, it is possible to realize savings in manufacturing costs for the element which cooperates with the element that has the self-cutting thread since a thread does not have to be created in advance when this element is being manufactured.

Advantageous developments of the air pressure measuring device for a vehicle tire according to the invention are described in the subordinate claims. All combinations of at least two of the features disclosed in the claims, the description and/or the figures fall within the scope of the invention.

Most particularly preferred is an embodiment in which the element which is made from the harder material is the valve body, and the element which is made from the softer material is the cap nut. This is bound up with the fact that relatively powerful forces act on the valve body for example during axial tensioning on the vehicle wheel rim, but these must not cause the valve body to deform. However, such a danger would exist if the valve body were made from a relatively soft material. Moreover, when measurement electronics are used the weight of the electronic measuring instrument connected to the valve body generates powerful centrifugal forces at high wheel speeds, and these must be absorbed via the valve housing.

Further, it is most particularly preferred if the element consisting of softer material is made from plastic. The consequence of this is that then for example the valve body can be produced from aluminium, and the valve body is still able to form the corresponding thread in the plastic material with its self-cutting thread, despite the fact that it is made from aluminium, which is softer than steel. In particular, this also makes it possible for such an element made from plastic to be produced as an injection molded part. Preferably, relatively hard plastics are used as the plastic material, so that they are able to transfer the corresponding forces for axial tension on the vehicle wheel rim to the valve body. For example without limitation, polyamide may be cited as a suitable plastic material.

In order to apply the requisite torques to the cap nut, it is further particularly advantageous if an outer surface of the cap nut has a tool engagement surface. A tool engagement surface of such kind is particularly suitable in the case in which the cap nut made from plastic softer than metal is designed so that the requisite torques can be transferred to the cap nut without damaging or deforming it. Moreover, in contrast to a cap nut made from metal that is furnished with a coating, it is advantageous that the application of a tool does not lead to any damage to the coating which may result in corrosion.

In order to be able to connect a housing to the valve body to accommodate a measuring device, it is provided that the valve body may be connected to a fixing screw on an end face attached to the inside of the vehicle wheel rim via another threaded connection, wherein the fixing screw is preferably designed to create at least indirectly a positive locking fit with a partial area of the vehicle wheel rim for rotationally immobile positioning for the fixing screw on the vehicle wheel rim.

Although a valve body as described to this point is protected from media on the outside of the vehicle wheel rim on one side by the cap nut and on the other side usually by a closure cap made of plastic, particularly in order to provide an air pressure measuring device which is detachable throughout the service life of the vehicle tire, it is further advisable if the valve body is furnished with a surface treatment to lend it corrosion protection properties.

The invention also comprises a method with an air pressure measuring device according to the invention as described previously on a vehicle wheel rim, in which the valve body is inserted in a through-hole in the vehicle wheel rim from the inside of the vehicle wheel rim and then a cap nut is brought into operative connection with the valve body from the outside of the vehicle wheel rim, wherein subsequently when the cap nut is turned relative to the valve body a seating surface of the valve body is tensioned axially against a bearing surface in the area of the through-hole in the vehicle wheel rim. According to the invention, the method is characterized in that a thread is created in the cap nut or the valve body by a self-cutting thread conformed on the valve body or the cap nut when the cap nut is rotated relative to the valve body.

In a preferred refinement of the method according to the invention as described previously, it is provided that the valve body is equipped with a fastening element on the side facing the inside of the vehicle wheel rim via a further threaded connection, and that when the cap nut is rotated relative to the valve body the cap nut and the valve body temporarily rotate together about their axis of rotation, causing the fastening element to rotate relative to the valve body. In this way, a signal or electronic housing connected to the fastening element may be secured non-rotatably to the vehicle wheel rim.

In order to be able to create the corresponding thread in the element which consists of the softer material by means of the self-cutting thread, it is further provided that when the cap nut begins to rotate relative to the valve body a relative movement also takes place between the cap nut and the valve body.

BRIEF DESCRIPTION OF THE DRAWINGS

Further advantages, features and details of the invention will be presented in the following description of preferred embodiments and with reference to the drawing.

In the drawing.

The same elements or elements with the same function are denoted with the same reference numbers in the figures.

DETAILED DESCRIPTION

Figure 1:
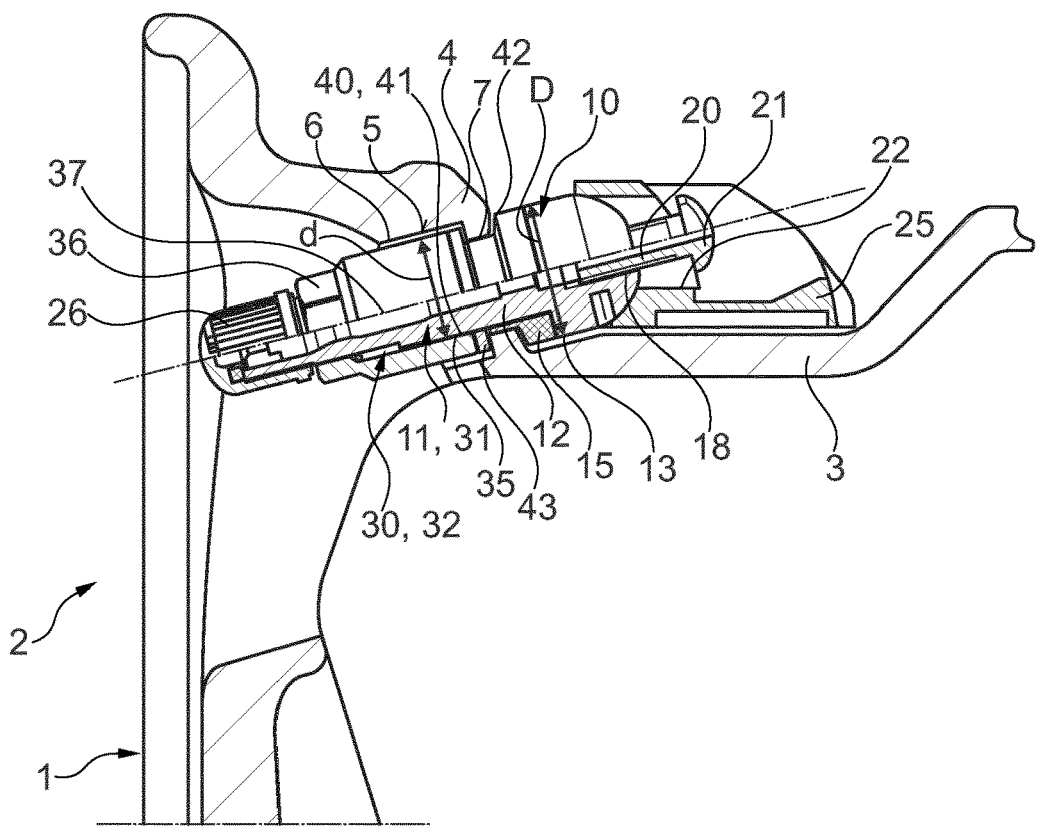
FIG. 1 is a partial cross-section through a vehicle wheel rim for a vehicle tire with a tire valve and a signal housing attached firmly thereto in the fully assembled state.

FIG. 1 shows a part of a rim 1 made from a die cast aluminium alloy for a vehicle wheel 2 with an air-filled vehicle tire (not shown). Vehicle wheel rim 1 has a radially surrounded rim well 3 and a through-hole 5 in the area of the outer lateral wall 4, which through-hole has a first section 6 with larger diameter and a second section 7 with smaller diameter. Through-hole 5 serves to accommodate and secure a tire valve and an air pressure measuring device 10.

Air pressure measuring device 10 has an elongated valve body 11, which is preferably but without limitation made from aluminium and treated with corrosion-inhibiting measures such as a corresponding coating or anodisation treatment. Valve body 11 includes a passthrough section 12 with smaller diameter, which is adapted to the diameter of the second section 7 of through-hole 5 in such manner that it is possible to pass valve body 11 axially through second section 7 of through-hole 5. The side of valve body 11 facing rim well 3 has a seat section 13, the diameter D of which is larger than diameter d of passthrough section 12. In particular, diameter D of seat section 13 is larger than the corresponding (inner) diameter of through-hole 5. A sealing element 15 made of an elastic material is also arranged on the passthrough section 12 of valve body 11, in the transition area between passthrough section 12 and support section 13, which sealing element protrudes into through-hole 5 when air pressure measuring device 10 is in the installed state (FIG. 1).

The end face of valve body 11 facing rim well 3 has a threaded hole 18 which cooperates with the outer thread of a fixing screw 20. The end of fixing screw 20 farthest from valve body 11 includes a screw head 21 with an irregular, for example polygonal outer surface, shaped so that it enables torque-proof positioning of fixing screw 20 in the area of a correspondingly shaped matching fitting aperture 22 of a signal or electronics housing 25. Details regarding the geometry of fixing screw 20 and of the signal or electronics housing 25 are disclosed in EP 1 277 601 B1, which to that extent is included as part of this application.

As shown in FIG. 1, a surface of signal housing 25, which is particularly made from plastic, lies flush on rim flange 3 and tensioned axially against valve body 11 by means of fixing screw 20. Signal housing 25 serves for example to accommodate a measuring device—not shown in greater detail—for detecting the air pressure in the tire of vehicle wheel 2 or the like. If a signal housing 25 is not used, the air pressure measuring device 10 described previously has no fixing screw 20, yet even so the air pressure in the tire of vehicle wheel 2 can still be determined by means of air pressure measuring device 10 for example by attaching a corresponding connector for a tire pressure measuring device.

A passthrough hole—not shown in greater detail—is provided in the longitudinal direction of valve body 11 and communicates pneumatically with the interior of the vehicle tire. A closure cap 26 which can be screwed onto the end region of valve body 11 serves to seal valve body (11) (from the exterior).

Figure 2:
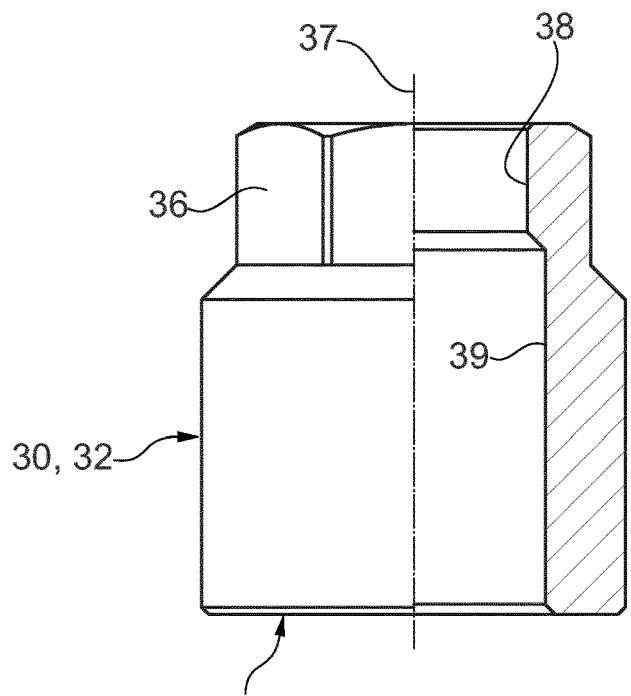
FIG. 2 is a partially cutaway side view of a cap nut made particularly from plastic for use in a tire valve according to FIG. 1.

A cap nut 30 represented in detail in FIG. 2 serves to secure valve body 11 in through-hole 5 of vehicle wheel rim 1 and to tension it axially and render it pressure-tight. Whereas valve body 11 constitutes a first element 31 in the formation of a threaded connection 35, cap nut 30 represents a second element 32 for forming the threaded connection 35.

It is essential for the purpose of the invention that the first element 31, that is to say valve body 11 in the embodiment shown, is made from a harder material compared with second element 32, i.e. cap nut 30. In the case that valve body 11 is made of aluminium, for example, as explained previously, the second element 32, i.e. cap nut 30, is thus particularly made of plastic. However, it may also be provided that, if valve body 11 is made of steel, for example, cap nut 30 may be made of aluminium.

If cap nut 30 is made of plastic, then it particularly has the form of an injection molded part and has a tool engagement surface 36 (for example a hexagonal engagement point) on an outer surface thereof, by means of which the cap nut 30 can be rotated about a longitudinal axis 37 by applying a torque to cap nut 30. Additionally, cap nut 30 has an inner wall with two sections 38, 39, wherein section 38 with a smaller inner diameter is arranged in the area of tool engagement surface 36. In particular, both sections 38, 39 are furnished with an untreated and relatively smooth surface. Section 39 with the larger (inner) diameter provides a deforming section for creating threaded connection 35.

Valve body 11, that is to say first element 31, has a self-cutting first thread 40 on the outer circumference thereof, which is designed to create a second thread 41 in section 39 of cap nut 30, which cooperates with thread 40 as a result of a relative rotating motion between valve body 11 and cap nut 30.

The installation of an air pressure measuring device 10 according to the invention as described in the preceding text on the vehicle wheel rim 1 is explained as follows: In a first step, valve body 11 together with the pre-fitted fixing screw 20 and signal housing 25 are passed through through-hole 5 from the inside of vehicle wheel rim 1 until valve body 11 (with interposed sealing element 15) comes into contact with a bearing surface 42 for seat section 13 on the inner side of vehicle wheel rim 1. Then, cap nut 30 is placed on passthrough section 12 on side farthest from the inner side of vehicle wheel rim 1, and upon contact with self-cutting thread 40 rotates about longitudinal axis 37. In this process, the first thread 40 cuts into the material of cap nut 30 and begins to create the second thread 41. As cap nut 30 is rotated on valve body 11, the torque that is applied to valve body 11 increases, so that valve body 11 begins to rotate together with cap nut 30. This causes fixing screw 20 to move axially into the corresponding fitting aperture 32 in signal housing 25, since the signal housing 25 is itself arranged non-rotatably with respect to vehicle wheel rim 1 and rim flange 3. As soon as either fixing screw 20 has reached its axial end position in the threaded hole 18, i.e. is bearing on the end stop, or the torque applied to valve body 11 via fixing screw 20 is greater than the torque applied to valve body 11 by cap nut 30, cap nut 30 begins to rotate, further forming the second thread 41 on valve body 11, until, as represented by the illustration of FIG. 1, cap nut 30 has reached its axial end position inside first section 6 of through-hole 5, in which the end face 43 of cap nut 30 closest to the second section 7 of through-hole 5 bears on the transition between the two sections 6, 7 of through-hole 5, and when cap nut 30 is rotated further it presses valve body 11 together with sealing element 15 axially against through-hole 5 on the side of section 5 of the through-hole 5 facing away from first section 6.

The air pressure measuring device 10 described above can be adapted or modified in many different ways without departing from the inventive thought.

REFERENCE SIGNS

1 Vehicle wheel rim
2 Vehicle wheel
3 Rim well
4 Lateral wall
5 Through-hole
6 First section
7 Second section
10 Air pressure measuring device
11 Valve body
12 Passthrough section
13 Seat section
15 Sealing element
18 Threaded hole
20 Fixing screw
21 Screw head
22 Fitting aperture
25 Signal housing
26 Closure cap
30 Cap nut
31 First element
32 Second element
35 Threaded connection
36 Tool engagement surface
37 Longitudinal axis
38 Section
39 Section
40 Thread
41 Thread
42 Bearing surface
43 End face
d Diameter
D Diameter

The invention claimed is:

1. Air pressure measuring device (10) for a vehicle wheel (2), having a valve body (11) which constitutes a first element (31) and which can be inserted in a through-hole (5) in a vehicle wheel rim (1), having a cap nut (30) which constitutes a second element (32) for axially tensioning the valve body (11) on the vehicle wheel rim (1), wherein when the air pressure measuring device (10) is in the installed state a threaded connection (35) is created between the valve body (11) and the cap nut (30), consisting of a thread (40) formed on the valve body (11) and a thread (41) formed on cap nut (30), wherein, in order to create one of the two threads (40, 41) both elements (31, 32) are made from materials of different hardnesses, a self-cutting thread (40) is produced in the element (31) that is made of the harder material, and a deforming section (39) is produced in the element (32) that is made of the softer material, in and in which the other thread (41) can be created by cooperation with the self-cutting thread (40).

2. Air pressure measuring device according to claim 1, wherein the element (31) that is made of the harder material is the valve body (11), and the element (32) that is made of the softer material is the cap nut (30).

3. Air pressure measuring device according to claim 1, wherein the element (32) that is made of the softer material consists of plastic.

4. Air pressure measuring device according to claim 3, wherein the element (32) that is made of the softer material is produced as an injection molded part.

5. Air pressure measuring device according to claim 3, wherein the valve body (11) is furnished with a surface treatment to lend it corrosion resistant properties.

6. Air pressure measuring device according to claim 1, wherein a tool engagement surface (36) is formed on an outer surface of the cap nut (30).

7. Air pressure measuring device according to claim 1, wherein an end face of the valve body (11) facing the inner side of the vehicle wheel rim (1) is connectable to a fixing screw (20) via an additional threaded connection (18), wherein the fixing screw (20) is designed to create at least indirectly a positive locking fit with a partial area of the vehicle wheel rim (1) for rotationally immobile positioning of the fixing screw (20) on the vehicle wheel rim (1).

8. Method for assembling an air pressure measuring device (10) on a vehicle wheel (2) according to claim 1, in which the valve body (11) is inserted in the through-hole (5) in the vehicle wheel rim (1) from the inner side of the vehicle wheel rim (1) and then the cap nut (30) is brought into operative connection with the valve body (11) from the outer side of the vehicle wheel rim (1), wherein when the cap nut (30) is subsequently rotated relative to the valve body (11) the valve body (11) is tensioned axially against a bearing surface (42) in the region of the through-hole (5) in the vehicle wheel rim (1), wherein as the cap nut (30) is rotated relative to the valve body (11) the other thread (41) is created in the cap nut (30) or the valve body (11) by the self-cutting thread (40) on the valve body (11) or the cap nut (30).

9. Method according to claim 8, wherein the side of the valve body (11) facing the inner side of the vehicle wheel rim (1) is fitted with a fastening element (20) via a further threaded connection (18), and when the cap nut (30) is rotated relative to the valve body (11) the cap nut (30) and the valve body (11) temporarily rotate together about their axis of rotation (37), causing the fastening element (20) to rotate relative to the valve body (11).

10. Method according to claim 9, wherein when the cap nut (30) begins to rotate relative to the valve body (11) a relative motion takes place between the cap nut (30) and the valve body (11).

* * * * *